US010965605B2

United States Patent
Nagao et al.

(10) Patent No.: US 10,965,605 B2
(45) Date of Patent: Mar. 30, 2021

(54) COMMUNICATION SYSTEM, COMMUNICATION CONTROL METHOD, AND COMMUNICATION APPARATUS

(71) Applicant: ALAXALA Networks Corporation, Kanagawa (JP)

(72) Inventors: Koyuru Nagao, Kawasaki (JP); Kazuo Sugai, Kawasaki (JP); Takumi Nakaki, Kawasaki (JP); Takayuki Muranaka, Kawasaki (JP); Takeshi Gotou, Kawasaki (JP)

(73) Assignee: ALAXALA NETWORKS CORPORATION, Kanagawa (JP)

( * ) Notice: Subject to any disclaimer, the term of this patent is extended or adjusted under 35 U.S.C. 154(b) by 0 days.

(21) Appl. No.: 16/504,412

(22) Filed: Jul. 8, 2019

(65) Prior Publication Data

US 2020/0036645 A1 Jan. 30, 2020

(30) Foreign Application Priority Data

Jul. 27, 2018 (JP) .............................. JP2018-140924

(51) Int. Cl.
*H04L 12/873* (2013.01)
*H04L 12/863* (2013.01)
*H04L 29/12* (2006.01)
*H04L 12/825* (2013.01)
*H04L 12/26* (2006.01)

(52) U.S. Cl.
CPC ........ *H04L 47/522* (2013.01); *H04L 43/0829* (2013.01); *H04L 47/25* (2013.01); *H04L 47/621* (2013.01); *H04L 61/6022* (2013.01)

(58) Field of Classification Search
CPC ... H04L 47/522; H04L 43/0829; H04L 47/25; H04L 47/621; H04L 61/6022
See application file for complete search history.

(56) References Cited

U.S. PATENT DOCUMENTS

2002/0165961 A1* 11/2002 Everdell ................. H04L 41/22
709/225
2007/0280245 A1* 12/2007 Rosberg .................. H04L 47/10
370/392

(Continued)

FOREIGN PATENT DOCUMENTS

JP 2017-188870 A 10/2017

*Primary Examiner* — Benjamin H Elliott, IV
(74) *Attorney, Agent, or Firm* — Mattingly & Malur, PC (57) ABSTRACT

A communication system, comprising: a communication apparatus controlling transmission and reception of data in a network connecting a server and a user terminal; and a management apparatus, the network including an edge apparatus, the communication apparatus including a relay unit which has a queue for each communication flow, and controls the transmission and reception of data using the queue, the management apparatus including a monitoring unit which identifies a communication flow where data loss has occurred, calculates modifications for settings for communication control used for a queue corresponding to the identified communication flow, and transmits to the communication apparatus a modification command including the modifications, and the relay unit modifies settings for communication control using the queue corresponding to the identified communication flow on the basis of the modifications included in the modification command.

12 Claims, 6 Drawing Sheets

(56) References Cited

U.S. PATENT DOCUMENTS

| | | | |
|---|---|---|---|
| 2008/0267185 A1* | 10/2008 | Biskner | H04L 43/00 370/392 |
| 2009/0316714 A1* | 12/2009 | Kodaka | H04L 47/2408 370/412 |
| 2010/0182920 A1* | 7/2010 | Matsuoka | H04L 43/00 370/252 |
| 2012/0069739 A1* | 3/2012 | Yabusaki | H04L 43/0888 370/235 |
| 2012/0188874 A1* | 7/2012 | Kumagai | H04L 47/2441 370/235 |
| 2017/0195161 A1* | 7/2017 | Ruel | H04L 63/061 |
| 2017/0289055 A1* | 10/2017 | Sugai | H04L 47/22 |
| 2019/0222660 A1* | 7/2019 | Bifulco | H04L 43/0811 |
| 2019/0260658 A1* | 8/2019 | Gell | G06F 3/064 |
| 2020/0036645 A1* | 1/2020 | Nagao | H04L 61/6022 |

* cited by examiner

| DEVICE ID 12401 | OUTPUT PORT 12402 | LINE BANDWIDTH 12403 | PACKET LOSS COUNT 12404 | DESTINATION_ IP_ADDRESS 12405 | DESTINATION_ MAC_ADDRESS 12406 |
|---|---|---|---|---|---|
| A1 | 1 | 100Mbps | 100 | 01.XX.XX.XX. | 01.XX.XX.XX.XX.XX |
| B1 | 3 | 1000Mbps | 250 | 02.XX.XX.XX | 02.XX.XX.XX.XX.XX |
| C1 | 6 | 1000Mbps | 300 | 03.XX.XX.XX | 03.XX.XX.XX.XX.XX |
| ⋮ | ⋮ | ⋮ | ⋮ | ⋮ | ⋮ |
| Xn | 6 | 1000Mbps | 300 | 0n.XX.XX.XX | 0n.XX.XX.XX.XX.XX |

| DESTINATION_IP_ADDRESS 12501 | DESTINATION_MAC_ADDRESS 12502 | OUTPUT PORT 12503 | QUEUE NUMBER 12504 | LIMIT QUEUE LENGTH 12505 | QUEUE BANDWIDTH 12506 |
|---|---|---|---|---|---|
| 01.XX.XXX.XX. | 01.XX.XX.XX.XX.XX | 1 | 5 | 512kbyte | 100Mbps |
| 02.XX.XXX.XX | 02.XX.XX.XX.XX.XX | 3 | 4 | 256kbyte | 1000Mbps |
| 03.XX.XXX.XX | 03.XX.XX.XX.XX.XX | 6 | 8 | 1Mbyte | 1000Mbps |
| ... | ... | ... | ... | ... | ... |
| 0n.XX.XXX.XX | 0n.XX.XX.XX.XX.XX | n | 8 | 1Mbyte | 1000Mbps |

COMMUNICATION SYSTEM, COMMUNICATION CONTROL METHOD, AND COMMUNICATION APPARATUS

CLAIM OF PRIORITY

The present application claims priority from Japanese patent application JP 2018-140924 filed on Jul. 27, 2018, the content of which is hereby incorporated by reference into this application.

BACKGROUND OF THE INVENTION

The present invention relates to a communication system, a communication control method, and a communication apparatus that suppresses packet loss resulting from burst traffic or the like within a network.

In recent years, due to an increase in network traffic resulting from the development of video distribution services and the like, there is demand for accommodating greater bandwidth lines at core nodes within a network. However, in typical networks, lines where edge nodes accommodate users and the like are slower than lines accommodated by core nodes. Thus, packet loss resulting from the difference in line speeds is an issue for edge nodes.

The technique disclosed in JP 2017-188870 A is known as a technique in which a function for solving this issue is applied to a communication apparatus such as a network switch serving as a core node, for example.

JP 2017-188870 A discloses a "communication apparatus that transmits packets addressed to the user that are delivered from a server and transmits packets received through a network to the server, in which the packets addressed to the user are transmitted to the user from an edge apparatus located at an edge of the network, and the communication apparatus has: a packet relay unit that relays packets transmitted/received between the server and the network, controls the packet bandwidth, and extracts packet-related information included in the packet; a virtual queue length calculation unit that calculates and stores a virtual queue length, which is an estimated value of the length of a transmission queue addressed to each of the users in the edge apparatus on the basis of the packet-related information and bandwidth information of a line between the edge apparatus and the user, and determines whether or not bandwidth control is required for each user on the basis of the virtual queue length and predetermined conditions; and a control unit that controls the packet relay unit and the virtual queue length calculation unit so as to perform bandwidth control for packets addressed to the users for each user in the packet relay unit on the basis of results of the determination by the virtual queue length calculation unit."

SUMMARY OF THE INVENTION

Traffic from a server to a user in a network is transmitted from a communication apparatus having a high-speed server line to an edge node that accommodates a user line, through a network including a core node. The edge node that accommodates the user line has a queue that accumulates traffic to the user line, but the user line is slow compared to lines in the network, and thus, there are cases of packet loss resulting from queue overflow.

In JP 2017-188870 A, the virtual queue length, which is an estimated value of the length of the transmission queue addressed to each user in the edge node, is calculated and stored on the basis of information related to packets that are transmitted/received through a communication apparatus serving as a core node and bandwidth information of the line between the edge node and the user, the necessity or lack thereof for bandwidth control is determined for each user on the basis of the virtual queue length and predetermined conditions; and bandwidth control is performed for the packets addressed to each user in the packet relay unit in the core node.

Thus, the method of JP 2017-188870 A has the problem of not being able to handle fluctuations in traffic in a network controlled by the core node. Also, the method of JP 2017-188870 A has the problem of not being able to handle communication between edge nodes that does not pass through the core node. Communication between edge nodes that does not pass through the core node refers to direct communication or the like between users such as seen in VoIP (Voice over Internet Protocol), for example.

An object of the present invention is to realize, in a core node, a communication system, method, and device that suppresses packet loss at an edge node regardless of the traffic route or the presence or absence of functions in communication apparatus outside of the core node.

A representative example of the present invention disclosed in this specification is as follows: a communication system comprises: a communication apparatus controlling transmission and reception of data in a network connecting a server that provides a service to a user terminal and the user terminal; and a management apparatus controlling the communication apparatus. The network includes an edge apparatus allocated between the user terminal and the communication apparatus. The communication apparatus includes a relay unit which has a queue for each communication flow between the user terminal and the server, and is configured to control the transmission and reception of data using the queue, the queue temporarily accumulates data transmitted to the user terminal from the server. The management apparatus includes a monitoring unit which is configured to identify a communication flow where data loss has occurred, calculate modifications for settings for communication control used for the queue corresponding to the identified communication flow, and transmit to the communication apparatus a modification command including the modifications. The relay unit is configured to modify settings for communication control using the queue corresponding to the identified communication flow on the basis of the modifications included in the modification command in a case of receiving the modification command.

According to one aspect of the present invention, the communication apparatus (core node) can suppresses packet loss in an edge apparatus (edge node). Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein.

DETAILED DESCRIPTION OF EMBODIMENTS

Below, embodiments of the present invention will be explained with reference to appended figures. Configurations common between the respective figures are given the same reference characters.

Embodiment 1

In Embodiment 1, a network system for providing a service from a server to a user terminal will be described as an example of the present invention. The server distributes videos, music, or the like to the user terminal, for example.

Figure 1:
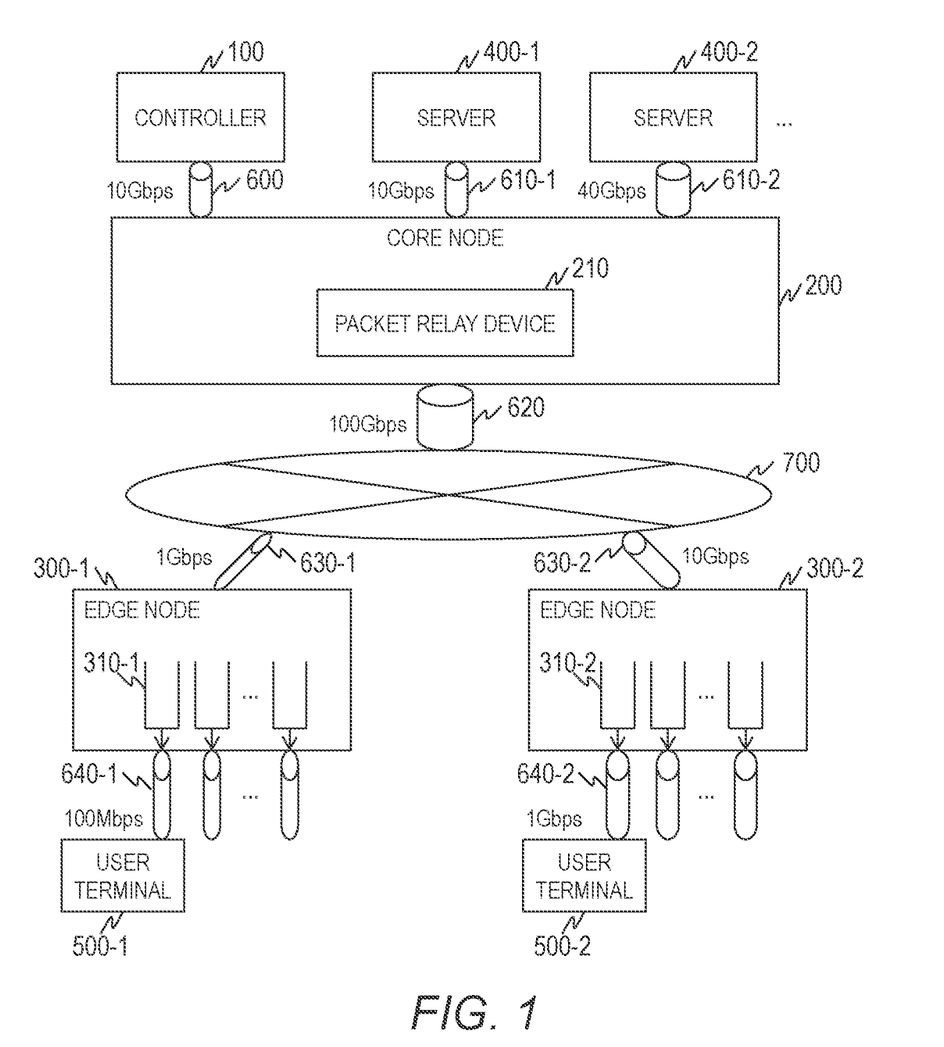
FIG. 1 is a diagram for illustrating a configuration example of a network system according to Embodiment 1.

FIG. 1 is a diagram for illustrating a configuration example of a network system according to Embodiment 1.

The network system includes a controller 100, a core node 200, a plurality of edge nodes 300, a plurality of servers 400, a plurality of user terminals 500, and an edge network 700 constituted of a plurality of relay apparatuses. The edge network 700 is constituted of one or more relay apparatuses. Also, the edge network 700 constitutes a portion of the network connecting the servers 400 and the user terminals 500.

The controller 100 and the core node 200 are connected through a line 600. The server 400-1 and the core node 200 are connected through a line 610-1, and the server 400-2 and the core node 200 are connected through a line 610-2. The core node 200 and the edge node 300-1 are connected through the line 620, the edge network 700, and the line 630-1, and the core node 200 and the edge node 300-2 are connected through the line 620, the edge network 700, and the line 630-2. The edge node 300-1 and the user terminal 500-1 are connected through a line 640-1, and the edge node 300-2 and the user terminal 500-2 are connected through a line 640-2.

Connection between the apparatuses may be wired or wireless. In a case where the connection is wired, the apparatuses are connected through a connecting line such as a metal cable, an optical cable, or the like. The core node 200 and each edge node 300 may be directly connected to each other without passing through the edge network 700.

The servers 400 provide services to a plurality of user terminals 500, and thus, higher speed lines are used for the lines 610 than the lines 640. For example, the lines 610-1 and 610-2 are 10 Gbps and 40 Gbps, respectively, and the lines 640-1 and 640-2 are 100 Mbps and 1 Gbps, respectively.

The servers 400 provide a distribution service or the like for data such as videos. In the network, data is transmitted/received as packets. The servers 400 include a CPU, a memory, a network interface, and the like, which are not shown. The user terminals 500 are terminals operated by users who use the service. The user terminals 500 include a CPU, a memory, a network interface, and the like. Generally, the servers 400 provide services to a plurality of user terminals 500, and thus, have more processing power than the user terminals 500.

The controller 100 is a management apparatus that monitors the state of the edge nodes 300, and controls the core node 200 on the basis of monitoring results. Details regarding the configuration of the controller 100 will be described with reference to FIG. 2.

The core node 200 and the edge nodes 300 are communication apparatuses that control the forwarding of data (packets) that are transmitted/received in the network connecting the servers 400 and the user terminals 500.

The core node 200 includes a packet relay device 210. Details regarding the configuration of the core node 200 will be described with reference to FIG. 3.

The edge nodes 300 include a CPU, a memory, a network interface, and the like, which are not shown. The edge nodes 300 has a user queue 310 for each user terminal 500. The edge nodes 300 accumulate packets transmitted from the servers 400 in the user queue 310, read packets from the user queue 310 according to the bandwidth of the line 640 and the load on the user terminal 500, and transmit the packets to the user terminal 500.

The memory of the edge node 300 stores information pertaining to the operating state of the edge node 300 such as setting information regarding the line speed of the port, setting information for the VLAN, information for use in packet transmission, logs that manage statistical data such as the number of received packets, the number of transmitted packets, and the number of lost packets, and the like. In the description below, information regarding the operating state of the edge nodes 300 is also referred to as operating state information. Information for use in packet transmission is the FDB (forwarding database) in the case of a layer 2 network, and IP route information in the case of a layer 3 network. Also, in the case of a network that handles SNMP (Simple Network Management Protocol), the logs are stored as an MIB (Management Information Base).

In Embodiment 1, it is assumed that the edge nodes 300 have a function of managing access to the operating state information. By assigning an IP address for management to each edge node 300 and accessing the IP address through the port of each edge node 300, it is possible to manage the edge nodes 300.

The IP addresses set for the edge nodes 300 may be set manually or be set automatically using a DHCP (Dynamic Host Configuration Protocol) server installed in the network.

Also, the VLANs that can access the IP address may be limited in order to protect the edge nodes 300 from access by users other than the manager. In such a case, a management VLAN would be set as a VLAN that can access the management IP address, for example. The controller 100 can find edge nodes 300 by pinging (broadcast pinging) all IP addresses.

Figure 3:
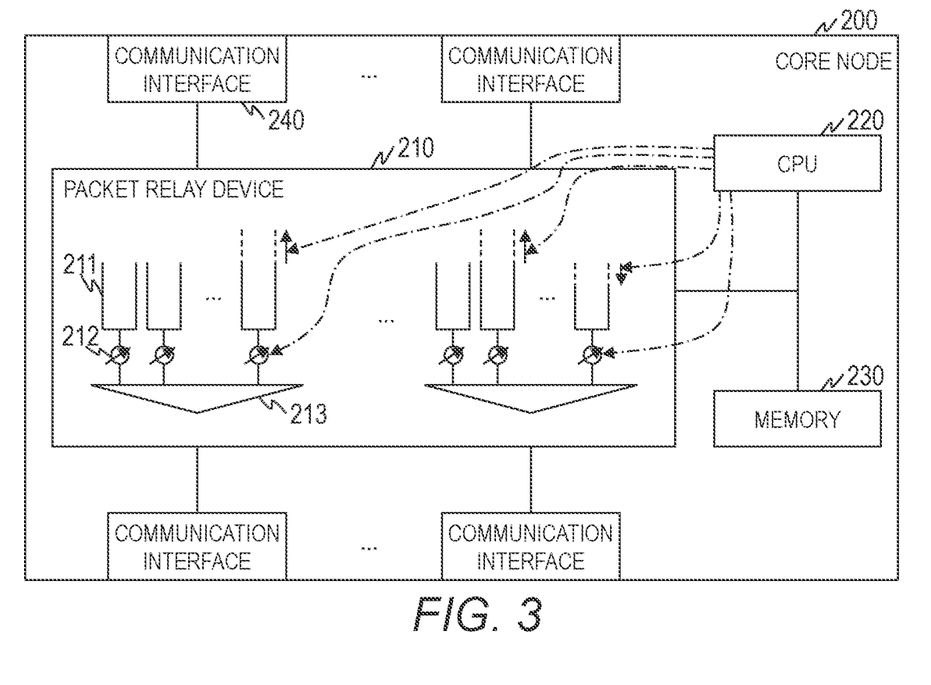
FIG. 3 is a diagram for illustrating a configuration example of a core node of Embodiment 1.

In Embodiment 1, it is assumed that the core node 200 stores information indicating the relationship between destination information of a communication flow and identification information of the output port and the user queue 211 (see FIG. 3). In the description below, such information is also referred to as queue allocation information. In the case of a layer 2 network, the destination information is a MAC address, and in the case of a layer 3 network, the destination information is an IP address. Also, it is assumed that the core node 200 has a function of managing access to the queue allocation information. By assigning an IP address for management to the core node 200 and accessing the IP address through the port of the core node 200, it is possible to manage the core node 200.

The same methods used for the IP addresses set for the edge nodes 300 can be applied to setting and management methods for the management IP address of the core node 200.

It is assumed that the controller 100 stores in advance information of the IP address in order to access the core node 200 and the edge nodes 300.

Figure 2:
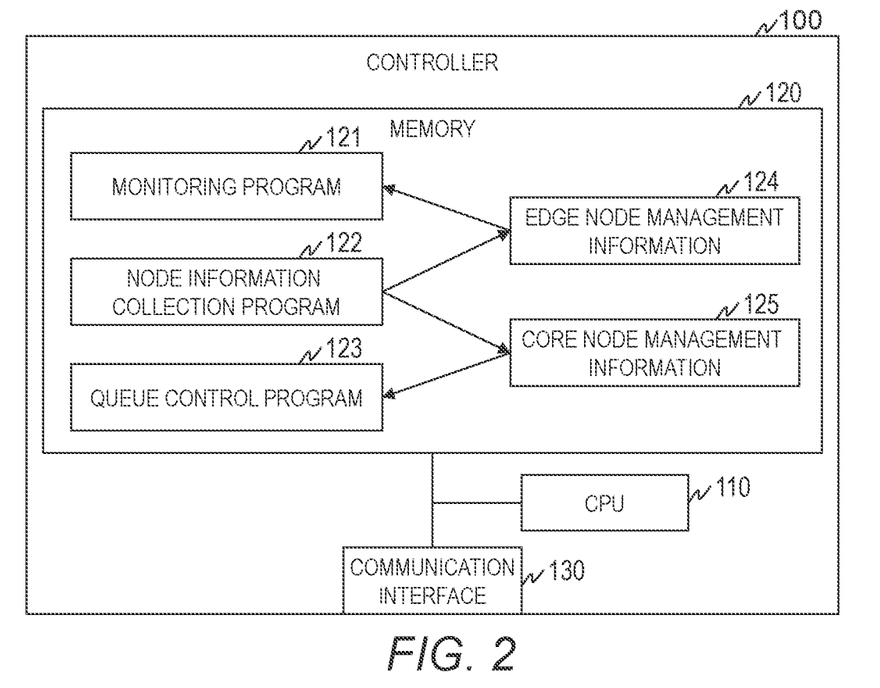
FIG. 2 is a diagram for illustrating a configuration example of a controller of Embodiment 1.

FIG. 2 is a diagram for illustrating a configuration example of the controller 100 of Embodiment 1.

The controller 100 includes a CPU 110, a memory 120, and a communication interface 130. The respective pieces of hardware are connected to each other through an internal bus.

The CPU 110 executes programs stored in the memory 120. The CPU 110 executes processes according to programs, thereby operating as function units (modules) to realize specific functions. In the description below, when a program that realizes a specific function is indicated to be executing a process, this in fact signifies that the CPU 110 is executing the program.

The memory 120 stores programs to be executed by the CPU 110 and information to be used by the programs. Also, the memory 120 includes a work area to be temporarily used by the programs. The programs and information stored in the memory 120 will be described later.

The communication interface 130 is an interface for communication between an external device such as the core node 200, the edge node 300, and the relay apparatus. The controller 100 uses the communication interface 130 to receive packets from the external device or transmit packets to the external device.

Here, the programs and information stored in the memory 120 will be described. The memory 120 stores a monitoring program 121, a node information collection program 122, a queue control program 123, edge node management information 124, and core node management information 125.

The monitoring program 121 is a program for controlling the entire controller 100. The monitoring program 121 monitors a timing of processes and determines whether the settings for communication control using the user queue 211 (see FIG. 3) of the core node 200 need to be changed.

The node information collection program 122 collects information from the edge node 300 and the core node 200 by using SNMP or the like, and generates edge node management information 124 and core node management information 125.

The queue control program 123 refers to the edge node management information 124 and the core node management information 125 to determine the settings for communication control using the user queue 211 (see FIG. 3) to be changed. In the present embodiment, the length of the user queue 211 and the control bandwidth to be used for bandwidth control performed during packet transmission from the user queue 211 are determined.

The edge node management information 124 stores information pertaining to packet loss that has occurred in the edge nodes 300. Details regarding the edge node management information 124 will be described with reference to FIG. 4.

The core node management information 125 stores information pertaining to settings for communication control using the user queue 211. Details regarding the core node management information 125 will be described with reference to FIG. 5.

Programs stored by the controller 100 may be kept as a plurality of programs for the respective functions, or the plurality of programs may be consolidated into one. The node information collection program 122 and the queue control program 123 may be incorporated into the monitoring program 121, for example.

FIG. 3 is a diagram for illustrating a configuration example of the core node 200 of Embodiment 1.

The core node 200 includes a packet relay device 210, a CPU 220, a memory 230, and a plurality of communication interfaces 240. The core node 200 may include just one communication interface 240.

The packet relay device 210 is connected to the plurality of communication interfaces 240 through an internal bus. Also, the packet relay device 210, the CPU 220, and the memory 230 are connected to each other through an internal bus.

The CPU 220 and the memory 230 are the same as the CPU 110 and the memory 120. The CPU 220 issues to the packet relay device 210 a command to change the queue length and the control bandwidth on the basis of communication control settings determined by the controller 100.

In a case where the communication interface 240 receives packets from an external device, the communication interface 240 outputs the packets to the packet relay device 210. At this time, the communication interface 240 assigns control information to the received packets. The control information is, for example, identification information for the communication interface 240, an identification number for a VLAN (Virtual LAN), or the like. Also, the communication interface 240 transmits packets outputted from the packet relay device 210 to an external device.

The packet relay device 210 performs forwarding control such as forwarding or discarding packets received by the core node 200. The packet relay device 210 is made of hardware such as an FPGA (field-programmable gate array) in order to execute commands in a simple and high-speed manner such as performing a high-speed search of forwarding information to be used for packet forwarding or performing communication of packets at wire speed.

The packet relay device 210 includes a plurality of queue control mechanisms constituted of a plurality of user queues 211, a plurality of bandwidth control units 212, and an arbitration unit 213. The user queue 211 and the bandwidth control unit 212 are managed so as to be linked one-to-one. Also, the output port and the queue control mechanism are managed so as to be linked one-to-one. That is, the packet relay device 210 includes the same number of queue control mechanisms as output ports.

The user queue 211 is a queue for accumulating packets addressed to the plurality of user terminals 500 connected to the edge nodes 300. In Embodiment 1, it is assumed that the initial value of the length of the user queue 211 is set in advance. However, the length of the user queue 211 is dynamically changed according to commands from the controller 100. Also, in Embodiment 1, it is assumed that the user terminals 500 and the user queues 211 are managed so as to be associated one-to-one.

The bandwidth control unit 212 performs bandwidth control when packets stored in the user queue 211 are being transmitted. Specifically, the bandwidth control unit 212 reads packets from the user queue 211 on the basis of the control bandwidth and outputs the packets to the communication interface 240. It is assumed that the initial value of the control bandwidth is set in advance. However, the control bandwidth is dynamically changed according to commands from the controller 100.

The arbitration unit 213 performs adjustments so as to prevent conflict between packets outputted from the user queues 211, or the like.

The user queue 211 and the bandwidth control unit 212 are configured so as to avoid packet loss in the edge nodes 300. In Embodiment 1, the controller 100 dynamically changes the queue length and control bandwidth according to the state of the edge nodes 300.

Here, the process performed when the core node 200 receives packets from the servers 400 will be described.

In a case of receiving packets addressed to a given user terminal 500 from the server 400, the packet relay device 210 identifies the output port for the edge node 300 to which the packets are to be forwarded on the basis of header information or the like used for forwarding the packets, and calculates a hash value. In the case of a layer 2 network, for example, the packet relay device 210 calculates the hash value according to the destination MAC address (Destination_MAC_Address), and in the case of a layer 3 network, the packet relay device 210 calculates the hash value according to the destination IP address (Destination_IP_Address).

The packet relay device 210 identifies the user queue 211 corresponding to the hash value among the user queues 211 included in the queue control mechanism linked to the identified output port, and stores the packet in this user queue 211.

If there are no settings for a communication flow corresponding to the received packets, the packet relay device 210 sets the storage destination for the received packets to the identified user queue 211, and sets an initial value for the control bandwidth of the bandwidth control unit 212 linked to the user queue 211, thereby setting the communication flow. The packet relay device 210 stores information indicating the relationship between the destination information and identification information of the output port and the user queue 211, for example. In the description below, such information is also referred to as queue allocation information. In the case of a layer 2 network, the destination information is a MAC address, and in the case of a layer 3 network, the destination information is an IP address.

The bandwidth control unit 212 reads packets from the user queue 211 according to the set control bandwidth and transmits the read packets to the edge nodes 300.

Figure 4:
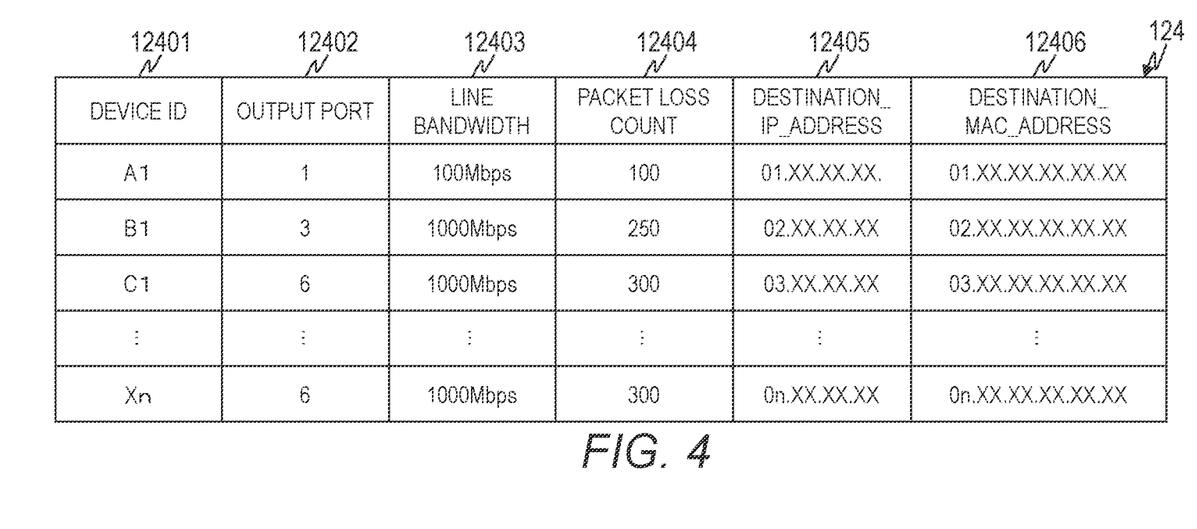
FIG. 4 is a table for showing an example of the data structure of edge node management information stored by the controller of Embodiment 1.

FIG. 4 is a table for showing an example of the data structure of the edge node management information 124 stored by the controller 100 of Embodiment 1.

The edge node management information 124 stores entries including information for grasping the packet loss situation in a communication flow for one user terminal 500. The edge node management information 124 shown in FIG. 4 has stored therein an n number of entries.

The entries stored in the edge node management information 124 include a device ID 12401, an output port 12402, a line bandwidth 12403, a packet loss count 12404, a Destination_IP_Address 12405, and a Destination_MAC_Address 12406. This configuration of the preceding entries constitutes just one example and is not limited to this example.

The device ID 12401 is a field that stores identification information for uniquely identifying an edge node 300 where packet loss was detected. In a case where the controller 100 has identified the IP address set for the edge node 300, then the IP address is stored as the device ID 12401.

The output port 12402 is a field that stores identification information of the port (output port) of the edge node 300 that is the transmission destination for packets in a communication flow where packet loss has occurred. An output port number is stored for the output port 12402 of Embodiment 1.

The line bandwidth 12403 is a field that stores the line bandwidth of the output port.

The packet loss count 12404 is a field that stores the number of lost packets in the user queue 310 corresponding to the communication flow.

The Destination_IP_Address 12405 and the Destination_MAC_Address 12406 are fields that store information for identifying the communication flow. Specifically, the Destination_IP_Address 12405 is a field that stores the IP address indicating the destination of the packet. The Destination_MAC_Address 12406 is a field that stores the MAC address indicating the destination of the packet.

The entry may include just either one of the Destination_IP_Address 12405 and the Destination_MAC_Address 12406.

Figure 5:
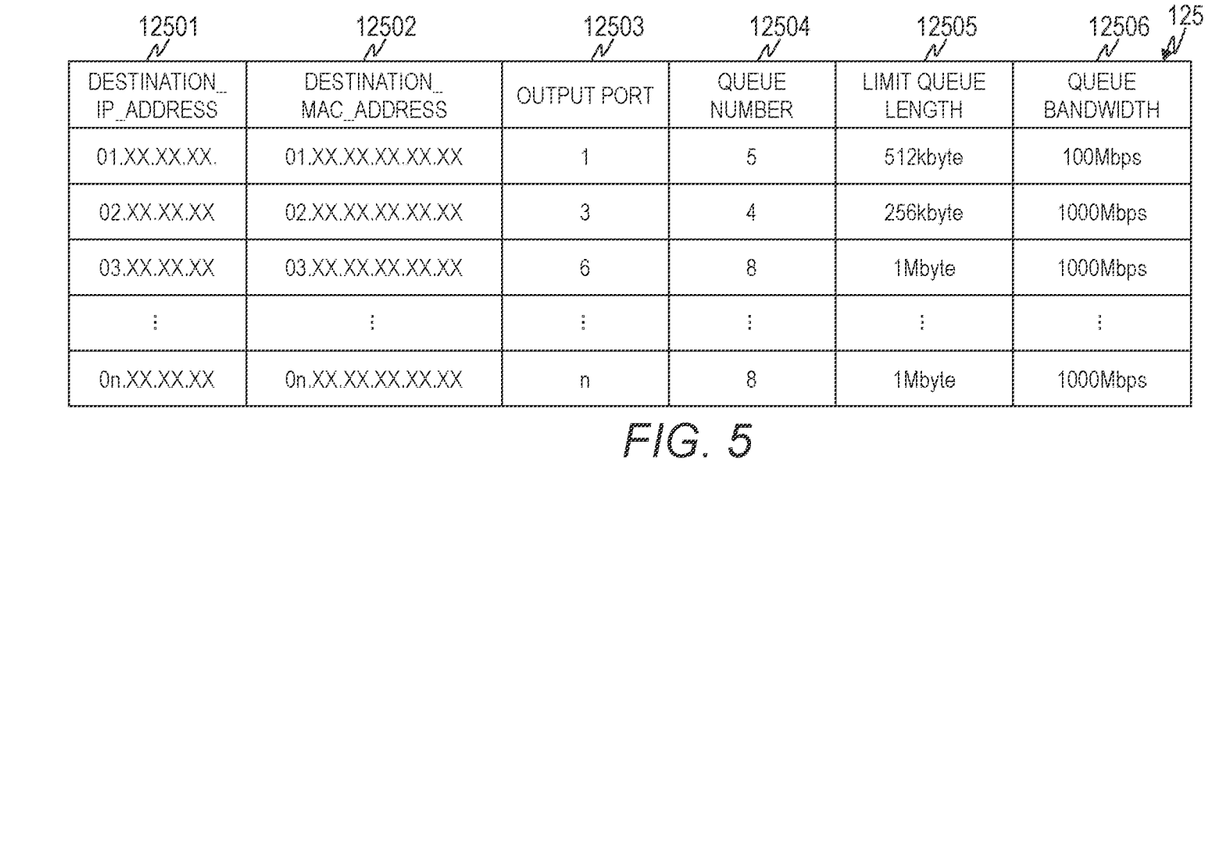
FIG. 5 is a table for showing an example of the data structure of core node management information stored by the controller of Embodiment 1.

FIG. 5 is a table for showing an example of the data structure of the core node management information 125 stored by the controller 100 of Embodiment 1.

The core node management information 125 stores entries including information for managing controls for the user queue 211 corresponding to one communication flow where packet loss has occurred. The core node management information 125 shown in FIG. 5 has stored therein an n number of entries.

The entries included in the core node management information 125 are constituted of a Destination_IP_Address 12501, a Destination_MAC_Address 12502, an output port 12503, a queue number 12504, a limit queue length 12505, and a queue bandwidth 12506. This configuration of the preceding entries constitutes just one example and is not limited to this example.

The Destination_IP_Address 12501 and the Destination_MAC_Address 12502 are the same fields as the Destination_IP_Address 12405 and the Destination_MAC_Address 12406. One entry is generated for each communication flow identified by at least one of the Destination_IP_Address 12501 and the Destination_MAC_Address 12502.

The output port 12503 is a field that stores identification information of the port (output port) of the core node 200 that is the transmission destination for packets in a communication flow where packet loss has occurred. An output port number is stored for the output port 12503 of Embodiment 1. The queue number 12504 is a field that stores identification numbers of the user queues 211 that store packets in a communication flow where packet loss has occurred. The number of the user queue 211 is stored for the queue number 12504 of Embodiment 1.

There are cases in which there are two or more entries with the same value set for the queue number 12504, but the user queue 211 of Embodiment 1 is uniquely set by the combination of the output port and the queue number, and thus, the fact that there are two or more entries with the same value poses no problem.

The limit queue length 12505 is a field that stores the maximum queue length of the user queue 211. In Embodiment 1, the user queue 211 is adjusted so as to be less than or equal to the value set for the limit queue length 12505.

The queue bandwidth 12506 is a field that stores the control bandwidth.

In a case where the network includes a plurality of core nodes 200, the controller 100 stores core node management information 125 for each core node 200.

Next, details of the process executed by the controller 100 and the core node 200 will be described with reference to FIGS. 6 and 7.

Figure 6:
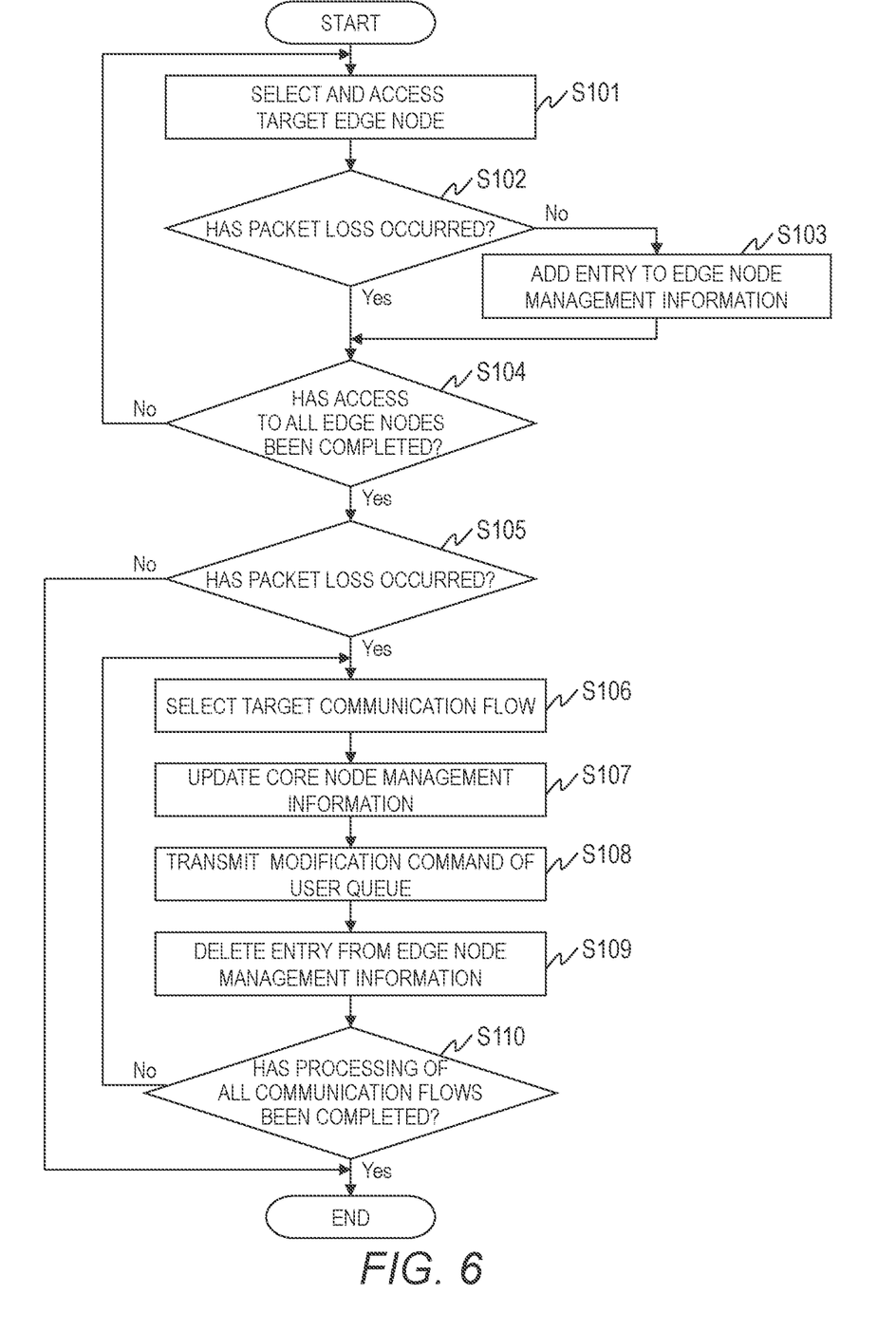
FIG. 6 is a flowchart for illustrating a process executed by the controller of Embodiment 1.

FIG. 6 is a flowchart for illustrating the process executed by the controller 100 of Embodiment 1.

In a case where the monitoring program 121 detects the start of execution, the process described below is started. The monitoring program 121 determines whether a preset execution period has passed, and if the execution period has passed, determines that the start of execution has been detected, for example. The monitoring program 121 may determine the start of execution upon receipt of an execution command from a manager or the like.

First, the monitoring program 121 calls the node information collection program 122. The node information collection program 122 selects a target edge node 300, and accesses the selected target edge node 300 to obtain the operating state information (step S101), and determines whether packet loss has occurred (step S102).

Specifically, the node information collection program 122 selects the target edge node 300 on the basis of the IP address information of the edge node 300. Also, the node information collection program 122 accesses the target edge node 300 and obtains the operating state information of the target edge node 300. The node information collection program 122 determines whether there is a communication flow where packet loss has occurred in the target edge node 300 on the basis of the MIB or the like, which is one piece of operating state information.

In a case where packet loss is determined not to have occurred, then the node information collection program 122 progresses to step S104.

In a case where packet loss is determined to have occurred, then the node information collection program 122 adds an entry to the edge node management information 124 (step S103), and progresses to step S104. The following process is executed in step S103.

The node information collection program 122 adds an entry to the edge node management information 124, and stores identification information of the target edge node 300 to the device ID 12401 of the added entry. The identification information of the target edge node 300 is included in the MIB, for example.

The node information collection program 122 obtains the output port, the line bandwidth set for the output port, and the number of lost packets from the MIB, which is one piece of operating state information, and sets the obtained values to the output port 12402, the line bandwidth 12403, and the packet loss count 12404, respectively. Also, the node information collection program 122 obtains the IP address and the MAC address associated with the output port from the route information, which is a piece of operating state information, as information for identifying the communication flow, and sets the obtained values to the Destination_IP_Address 12405 and the Destination_MAC_Address 12406, respectively.

In a case where there are a plurality of communication flows where packet loss has occurred in one edge node 300, an entry is added to the edge node management information 124 for each communication flow. The above is the description of the process of step S103.

In step S104, the node information collection program 122 determines whether access to all edge nodes 300 has been completed (step S104).

In a case where access to all edge nodes 300 is determined not to have been completed, then the node information collection program 122 returns to step S101 and executes a similar process.

In a case where access to all edge nodes 300 is determined to have been completed, then the node information collection program 122 notifies the monitoring program 121 that the process has been completed. In a case of receiving the notification, the monitoring program 121 determines whether packet loss has occurred (step S105).

Specifically, the monitoring program 121 determines whether there is at least one entry in the edge node management information 124. In a case where there is at least one entry in the edge node management information 124, the monitoring program 121 determines that packet loss has occurred.

In a case where packet loss is determined not to have occurred, then the monitoring program 121 ends the process.

In a case where packet loss is determined to have occurred, then the monitoring program 121 selects a target communication flow (step S106).

Specifically, the monitoring program 121 selects one entry from the edge node management information 124.

Next, the monitoring program 121 performs a query to obtain information pertaining to the user queue 211 corresponding to the target communication flow from the core node 200, and updates the core node management information 125 on the basis of the information obtained from the core node 200 (step S107). Specifically, the process below is executed.

The monitoring program 121 obtains addresses from the Destination_IP_Address 12405 and the Destination_MAC_Address 12406 of the entry selected in step S106 as information for identifying the target communication flow. In the description below, information for identifying the target communication flow is recorded as target communication flow information.

The target communication flow information may include, in addition to the destination IP address and MAC address, any of the following: the transmission source IP address and MAC address (Source_IP_Address, Source_MAC_Address), and the port number in TCP (Transmission Control Protocol) and UDP (User Datagram Protocol).

The monitoring program 121 calls the node information collection program 122. The node information collection program 122 issues a query including the target communication flow information to the core node 200.

At this time, the core node 200 obtains identification information of the output port on the basis of the target communication flow information and the route information. The core node 200 obtains identification information of the user queue 211 from the queue allocation information on the basis of the target communication flow information and the identification information of the output port. Also, the core node 200 obtains the limit queue length of the output port from the setting information for the output port on the basis of the identification information of the output port. The core node 200 transmits the identification information of the output port, the identification information of the user queue 211, and the limit queue length to the controller 100 as a response to the preceding query.

The node information collection program 122 searches for an entry matching the target communication flow information with reference to the Destination_IP_Address 12501 and the Destination_MAC_Address 12502. In a case where there are no entries, the node information collection program 122 adds an entry and sets the addresses, which are destination information of the communication flow, to the Destination_IP_Address 12501 and the Destination_MAC_Address 12502 of the added entry.

The node information collection program 122 sets values obtained from the core node 200 to the output port 12503, the queue number 12504, and the limit queue length 12505 of the added or searched entry.

The node information collection program 122 calculates a new control bandwidth to be set to the bandwidth control unit 212 corresponding to the user queue 211, and sets the calculated value to the queue bandwidth 12506 of the added or searched entry. Here, the calculation method for the bandwidth will be described.

(1) In a case where there is one communication flow linked to the output port of the edge node 300 where packet loss has occurred, the node information collection program 122 calculates the control bandwidth on the basis of Formula 1.

Formula 1

$$(\text{Control bandwidth}) = (\text{Bandwidth of output port of edge node}) \quad (1)$$

The number of entries, whose combinations of device ID 12401 and output port 12402 match, of the edge node management information 124 is equal to the number of communication flows linked to the output port of an edge node 300 where packet loss has occurred.

(2) In a case where there are a plurality of communication flows linked to the output port of the edge node 300 where packet loss has occurred, the node information collection program 122 calculates the new control bandwidth while considering the number of communication flows. The node information collection program 122 calculates the control bandwidth on the basis of Formula 2, for example.

Formula 2

$$(\text{Control bandwidth}) = \frac{(\text{Bandwidth of output port of edge node})}{(\text{Communication flow count})} \quad (2)$$

In a case of considering the statistical multiplexing effect, the node information collection program 122 calculates the control bandwidth on the basis of Formula 3, for example. SQRT is a function that returns a positive square root.

Formula 3

$$(\text{Control bandwidth}) = \frac{(\text{Bandwidth of output port of edge node})}{\text{SQRT}(\text{Communication flow count})} \quad (3)$$

If the frequency of burst traffic in each communication flow is low and it is estimated that burst traffic would not occur simultaneously in a plurality of communication flows linked to the output port of the edge node 300, then the node information collection program 122 may calculate the control bandwidth on the basis of Formula 1.

The formulas described above are merely examples and formulas are not limited thereto.

The node information collection program 122 notifies the monitoring program 121 that the process has been completed. The above is the description of the process of step S107.

Next, the monitoring program 121 calls the queue control program 123. The queue control program 123 transmits a modification command of the user queue 211 to the core node 200 (step S108).

Specifically, the queue control program 123 obtains, from the entry updated in step S107, the values of the output port 12503, the queue number 12504, the limit queue length 12505, and the queue bandwidth 12506, and transmits the modification command of the user queue 211 including the obtained values to the core node 200. Then the queue control program 123 notifies the monitoring program 121 that the process has been completed.

In a case where the core node 200 has the function of the controller 100, the modification command of the user queue 211 of the queue control program 123 may be outputted to a unique control frame.

In Embodiment 1, a modification command to set the length of the user queue 211 to the limit queue length is transmitted, but what is transmitted is not limited thereto. A configuration may be adopted in which the queue control program 123 calculates a new queue length on the basis of a given algorithm, and the new queue length is included in the modification command instead of the limit queue length.

Next, the monitoring program 121 deletes an entry corresponding to the target communication flow from the edge node management information 124 (step S109).

Next, the monitoring program 121 determines whether the process has been completed for all communication flows (step S110).

Specifically, the monitoring program 121 determines whether the edge node management information 124 is empty. In a case where the edge node management information 124 is empty, the monitoring program 121 determines that the process has been completed for all communication flows.

In a case where the process is determined not to have been completed for all communication flows, then the monitoring program 121 returns to step S106 and executes a similar process.

In a case where the process is determined to have been completed for all communication flows, then the monitoring program 121 ends the process.

Figure 7:
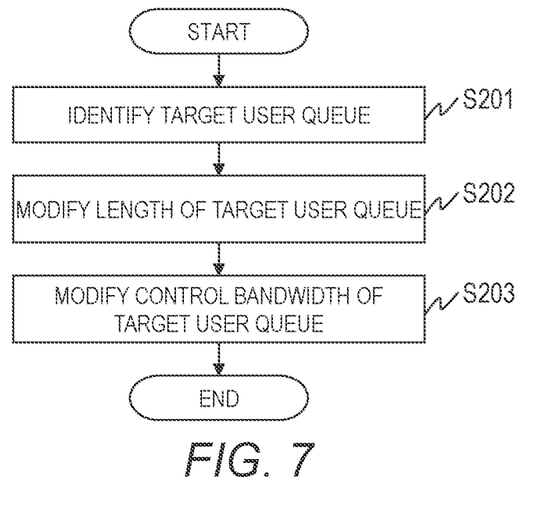
FIG. 7 is a flowchart for illustrating a process executed by the core node of Embodiment 1.

FIG. 7 is a flowchart for illustrating the process executed by the core node 200 of Embodiment 1.

In a case where the CPU 220 detects the start of execution, the process described below is started. In Embodiment 1, in a case where a modification command of the user queue 211 is received from the controller 100, the core node 200 determines that the start of execution has been detected.

The CPU 220 identifies a target user queue 211 on the basis of the output port and the queue number included in the modification command of the user queue 211 (step S201).

Next, the CPU 220 modifies the queue length and bandwidth of the target user queue 211 on the basis of the queue length and bandwidth included in the modification command of the user queue 211 (steps S202, S203). Then, the CPU 220 ends the process.

Specifically, the CPU 220 identifies the target user queue 211 on the basis of the values of the output port 12503 and the queue number 12504 included in the modification command of the user queue 211. The CPU 220 modifies the queue length of the target user queue 211 on the basis of the limit queue length 12505 included in the modification command of the user queue 211. Also, the CPU 220 modifies the bandwidth set for the bandwidth control unit 212 linked to the target user queue 211 on the basis of the value of the queue bandwidth 12506 included in the modification command of the user queue 211.

The core node 200 may execute a process for restoring the setting of the modified user queue 211 to its initial value. One possible process is as described below, for example.

In step S108, the monitoring program 121 adds a flag and an update time to an entry corresponding to the target communication flow of the core node management information 125. The update time is the time at which the queue control program 123 was called, for example.

Upon completion of the process of step S110, the monitoring program 121 searches for entries with a flag, and calculates the amount of time elapsed on the basis of the update time added to the entry and the current time. In a case where the elapsed time is greater than a threshold, then the monitoring program 121 sets the limit queue length 12505 and the queue bandwidth 12506 of the entry to their initial values, and deletes the flag and the update time. Then, the monitoring program 121 transmits a modification command of the user queue 211 to the core node 200 through the queue control program 123.

The controller 100 and the core node 200 have been described as different devices, but a configuration may be adopted in which the core node 200 has equivalent functions as the controller 100.

As described above, according to Embodiment 1, if packet loss resulting from packet overflow in the user queue 310 of the edge node 300 has been detected, then the controller 100 modifies the length of the user queue 211 and the control bandwidth to be set for the bandwidth control unit 212 for the user queue and bandwidth control unit corresponding to the communication flow (packet destination) where packet loss has occurred.

The length of the user queue 211 and the control bandwidth can be modified according to the state of the edge node 300, and thus, it is possible to suppress packet loss by efficient use of resources.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment.

What is claimed is:

1. A communication system, comprising:
   a communication apparatus controlling transmission and reception of data in a network connecting a user terminal and a server that provides a service to the user terminal; and
   a management apparatus, including a processor and a memory, controlling the communication apparatus,
   wherein the network includes an edge apparatus allocated between the user terminal and the communication apparatus,
   wherein the communication apparatus includes a relay unit, which includes a field-programmable gate array, and which has a queue for each communication flow between the user terminal and the server, and is configured to control the transmission and reception of data using the queue, the queue temporarily accumulates data transmitted to the user terminal from the server,
   wherein the processor of the management apparatus is programmed to identify a communication flow where data loss has occurred, calculate modifications of settings for communication control used for a queue corresponding to the identified communication flow, and transmit to the communication apparatus a modification command including the modifications,
   the relay unit being configured to modify settings for communication control using the queue corresponding to the identified communication flow on the basis of the modifications included in the modification command in a case of receiving the modification command,
   wherein the processor of the management apparatus is configured to calculate, as the modifications of the settings for communication control, a new queue length, which indicates a maximum queue length, for the queue corresponding to the identified communication flow, and a new control bandwidth to be set for the bandwidth control unit of the queue corresponding to the identified communication flow.

2. The communication system according to claim 1,
   wherein the processor of the management apparatus is configured to:
   determine whether data loss has occurred in the edge apparatus with reference to operating state information that is information pertaining to an operating state of the edge apparatus;
   identify the communication flow where the data loss has occurred on the basis of the operating state information in a case where the data loss is determined to have occurred in the edge apparatus; and
   issue a query to the communication apparatus including information pertaining to the identified communication flow, thereby identifying the queue corresponding to the identified communication flow.

3. The communication system according to claim 2,
   wherein the relay unit includes a bandwidth control unit which is configured to perform bandwidth control in a case of transmitting data accumulated in the queue on the basis of a control bandwidth, for each said queue.

4. The communication system according to claim 3,
   wherein the management apparatus is configured to calculate the new control bandwidth on the basis of a bandwidth of a line connecting the edge apparatus to the user terminal.

5. A communication control method in a network system including a communication apparatus that controls transmission and reception of data in a network connecting a user terminal and a server that provides a service to the user terminal, a management apparatus, including a processor and a memory, that controls the communication apparatus, wherein the network includes an edge apparatus allocated between the user terminal and the communication apparatus, and wherein the communication apparatus includes a relay unit, which includes a field-programmable gate array, and which has a queue for each communication flow between the user terminal and the server, and is configured to control the transmission and reception of data using the queue, the queue temporarily accumulates data transmitted to the user terminal from the server, and wherein the management apparatus is configured to modify settings for communication control using the queue, the communication control method including:
   a first step of identifying, by the management apparatus, a communication flow where data loss has occurred;
   a second step of calculating, by the management apparatus, modifications for settings for communication control using a queue corresponding to the identified communication flow;
   a third step of transmitting, by the management apparatus, to the communication apparatus a modification command including the modifications; and
   a fourth step of modifying, by the relay unit, settings for communication control using the queue corresponding to the identified communication flow on the basis of the modifications included in the modification command in a case of receiving the modification command, wherein the management apparatus is configured to calculate, as the modifications of the settings for communication control, a new queue length, which indicates a maximum queue length, for the queue corresponding to the identified communication flow, and a new control bandwidth to be set for the bandwidth control unit of the queue corresponding to the identified communication flow.

6. The communication control method according to claim 5,
wherein the first step includes:
a step of determining, by the management apparatus, whether data loss has occurred in the edge apparatus with reference to operating state information that is information pertaining to an operating state of the edge apparatus;
a step of identifying, by the management apparatus, the communication flow where the data loss has occurred on the basis of the operating state information in a case where the data loss is determined to have occurred in the edge apparatus; and
a step of issuing, by the management apparatus, a query to the communication apparatus including information pertaining to the identified communication flow, thereby identifying the queue corresponding to the identified communication flow.

7. The communication control method according to claim 6,
wherein the relay unit includes a bandwidth control unit which is configured to perform bandwidth control in a case of transmitting data accumulated in the queue on the basis of a control bandwidth, for each said queue.

8. The communication control method according to claim 7,
wherein the second step includes a step of calculating, by the management apparatus, the new control bandwidth on the basis of a bandwidth of a line connecting the edge apparatus to the user terminal.

9. A communication apparatus that controls transmission and reception of data in a network connecting a user terminal and a server that provides a service to the user terminal, the network including an edge apparatus allocated between the user terminal and the communication apparatus, the communication apparatus comprises:
a relay unit, which includes a field-programmable gate array, and has a queue for each communication flow between the user terminal and the server, and is configured to control the transmission and reception of data using the queue, the queue temporarily accumulates data transmitted to the user terminal from the server,
wherein a management apparatus coupled to the communication apparatus is configured to identify a communication flow where data loss has occurred, calculate modifications for settings for communication control used for a queue corresponding to the identified communication flow, the modifications including a new queue length, which indicates a maximum queue length, for the queue corresponding to the identified communication flow, and a new control bandwidth to be set for the bandwidth control unit of the queue corresponding to the identified communication flow, and output the modifications to the relay unit, and
wherein the relay unit is configured to modify settings for communication control using the queue corresponding to the identified communication flow on the basis of the modifications in a case of inputting the modification command.

10. The communication apparatus according to claim 9,
wherein the processor of the management apparatus is configured to:
determine whether data loss has occurred in the edge apparatus with reference to operating state information that is information pertaining to an operating state of the edge apparatus;
identify the communication flow where the data loss has occurred on the basis of the operating state information in a case where the data loss is determined to have occurred in the edge apparatus; and
issue a query to the relay unit including information pertaining to the identified communication flow, thereby identifying the queue corresponding to the identified communication flow.

11. The communication apparatus according to claim 10,
wherein the relay unit includes a bandwidth control unit which is configured to perform bandwidth control in a case of transmitting data accumulated in the queue on the basis of a control bandwidth, for each said queue.

12. The communication apparatus according to claim 11,
wherein the management apparatus is configured to calculate the new control bandwidth on the basis of a bandwidth of a line connecting the edge apparatus to the user terminal.

* * * * *